United States Patent Office 2,882,322
Patented Apr. 14, 1959

2,882,322

PRODUCTION OF CUMYLPHENOL FROM α-METHYLSTYRENE DIMER

William D. Griffin, Convent Station, and George G. Joris, Madison, N.J., assignors to Allied Chemical Corporation, New York, N.Y., a corporation of New York No Drawing. Application January 23, 1957
Serial No. 635,591

4 Claims. (Cl. 260—619)

This invention relates to the production of para-α-α-dimethyl benzyl phenol, more briefly called cumylphenol hereinafter in this specification.

Certain phenol still residues, particularly those which are obtained in the process of making phenol from cumene contain substantial amounts of α-methylstyrene dimer 2,5-diphenyl hexene-2 in addition to phenol and by-products such as cumylphenol and acetophenone. This dimer has in the past been discarded as a relatively useless by-product. It has now been found, however, that the otherwise undesirable dimer 2,5-diphenyl hexene-2 can be reacted with excess phenol to form additional cumylphenol prior to separation of the reactants from the residue and thus considerably enhance the yield of highly desirable cumylphenol obtainable from the residue.

The process is a simple one-step process which proceeds according to the following equation in which 2,5-diphenyl hexene-2, an open-chain α-methylstyrene dimer, reacts with two mols of phenol to form two mols of cumylphenol.

$\phi.CH(CH_3).CH_2.CH:C(CH_3).\phi$
$+2\phi OH \rightarrow 2\phi.C(CH_3)_2.\phi.OH$ The reaction is suitably carried out in the presence of a catalyst such as concentrated sulfuric acid and under temperature conditions which lie within the range of about 110°–140° C. The reaction goes to completion in ½ hour or less and yields of 80–90% have been obtained based on phenol consumed.

Not only is the process particularly well-adapted for use in enhancing the yield of cumylphenol obtainable from phenol still bottom residues but it can also be used effectively to produce cumylphenol from the dimers of α-methyl-styrene after they have been isolated or when they are in the presence of other ingredients which will not interfere with the reaction between phenol and the dimer in the presence of a catalyst such as sulfuric acid.

The specific catalyst which has been found most effective is concentrated sulfuric acid. This catalyst can be used effectively in concentrations within the range of 0.5–1.5% of the total. The preferred concentration, however, is about 1%.

For optimum results the reaction of the phenol with the dimer requires a mol ratio of phenol to dimer of at least 2:1. Higher ratios such as 4:1 and 8:1 do not adversely affect the yield of cumylphenol.

Best yields have been observed when operating at temperatures of about 110° C.

*Example 1.*—To a phenol still bottom which contained 22.1 parts of cumylphenol, 37 parts dimer, 2,5-diphenyl hexene-2, 10 parts acetophenone, 0 part phenol and 31 parts of unidentified organic matter were added 59 parts by weight of phenol, about twice the theoretical amount of phenol required to react with the dimer present. This brought the molar ratio of phenol to dimer to 4:1. This material was then reacted in the presence of controlled amounts of concentrated commercial sulfuric acid (96%). The results are summarized in Table No. 1.

TABLE NO. 1

*Formation of cumylphenol*

[Starting materials: 100 wt. phenol still bottoms plus 59 wt. phenol. Molar ratio phenol to dimer: 4:1.]

| Test No. | Temp., °C. | Wt. Percent, H₂SO₄ | Time, Hrs. | Percent Composition by IR Analysis ||||| Percent yield of cumylphenol ||
|---|---|---|---|---|---|---|---|---|---|---|
| | | | | Cumylphenol | Phenol | Dimer | Acetophenone | Unknown | Phenol | Dimer |
| Still bottom | | | 0 | 11.2 | 37.8 | 20 | 5.8 | 25.2 | | |
| 1 | 140 | 1.5 | 1 | 32.2 | 26.9 | 2.5 | 5.6 | 32.8 | 85 | 67 |
| | | | 4 | 29.1 | 25.5 | 1.4 | 4.9 | 39.2 | 65 | 54 |
| 2 | 110 | 1.5 | 0.5 | 30 | 28.2 | trace | 5.7 | 36.1 | 87 | 52 |
| | | | 1.5 | 31.9 | 26.2 | trace | 5.4 | 36.5 | 79 | 58 |
| | | | 2.5 | 28.5 | 24 | trace | 5.6 | 41.9 | 48 | 56 |
| 3 | 141 | 0.5 | 0.33 | 13.5 | 38.6 | 9.5 | 6 | 32.4 | | 12 |
| | | | 2 | 15.2 | 38.2 | 5 | 6.2 | 35.4 | | 15 |
| 4 | 110 | 0.5 | 0.33 | 13.7 | 38.2 | 15 | 5.8 | 27.3 | | 28 |
| | | | 2.5 | 13.7 | 37 | 10 | 6.2 | 33.1 | | 14 |
| 5 | 140 | 1.0 | 0.5 | 27.1 | 27.1 | 3 | 5.5 | 37.3 | 63 | 50 |

*Example 2.*—A number of syntheses were also run in which phenol was reacted with α-methylstyrene dimer (2,5-diphenyl hexene-2) to form cumylphenol. The data for the tests in which the starting material consisted only of the pure reactants (plus catalyst) are summarized in Table No. 2.

TABLE NO. 2
Formation of cumylphenol

| Run No. | Catalyst for all runs: 1% sulfuric acid | | | | | Product (IR Anal) Percent | | | Yield Based on Dimer |
|---|---|---|---|---|---|---|---|---|---|
| | Initial | | Molar Ratio, φOH/Dimer | Temp., °C. | Reac. Time, Hr. | φOH | Cumyl φOH | Unknown | |
| | Percent φOH | Percent Dimer | | | | | | | |
| 1 | 61.5 | 38.5 | 4:1 | 140 | ½ | 44.5 | 36.2 | 19.3 | 52 |
| | | | | | ¾ | 46.4 | 36.9 | 16.7 | 53 |
| 2 | 61.5 | 38.5 | 4:1 | 110 | ½ | 45.5 | 40.8 | 13.7 | 59 |
| | | | | | ¾ | 45.8 | 38.1 | 16.1 | 55 |
| | | | | | 1 | 41.5 | 37.5 | 21 | 54 |
| 3 | 70.5 | 29.5 | 6:1 | 110 | ½ | 60 | 30 | 10 | 57 |
| | | | | | 1 | 58 | 29 | 13 | 55 |
| 4 | 76.1 | 23.9 | 8:1 | 110 | ½ | 68.1 | 23 | 8.9 | 54 |
| | | | | | 1 | 68 | 24 | 8 | 56 |

These runs with sulfuric acid as catalyst were maintained uniformly at 1% $H_2SO_4$ concentration. It is evident from the data obtained that the required reaction time in all cases was very short, less than 20 minutes, since no dimer was detected in the product. Furthermore, some data indicate that prolonged reaction times lead to decreased yields of cumylphenol. Comparable tests which were run at 140 and 110° C. respectively resulted in somewhat better yields at the low temperature. The data tend to indicate that varying the initial molar ratio of phenol to dimer in the range of 4:1 to 8:1 has little effect on the yields.

*Example 3.*—A still bottom (analyzing 0% phenol, 22.1% cumylphenol, 37% dimer, 10% acetophenone, 31% unknown) was reacted with excess phenol (molar ratio phenol to dimer of 4:1) at 140° C., catalyzed by 1% concentrated commercial sulfuric acid (based on total mixture); reaction time was 0.5 hour. The product was neutralized and distilled, from which data the composition was calculated to be 1.6% water, 25.3% phenol, 5.9% acetophenone, 0.6% dimer, 32.7% cumylphenol, and 33.9% unknown. Calculations from these data show the yields of cumylphenol to be 67.8% from the phenol and 42.6% from dimer. Material losses throughout this run were extremely small.

*Example 4.*—A still bottom was maintained at 128° C. for 0.5 hour in the presence of 1% sulfuric acid. The initial analysis was 31.7% phenol, 13.1% cumyphenol, 13.6% dimer, 12.4% acetophenone and 29.1% unknown, for a phenol to dimer molar ratio of 5.9:1; no phenol was added in this case. Analysis of the reaction product indicated 26.4% phenol, 21.3% cumylphenol, 13% acetophenone, 0% dimer, 39.3% unknown. Yields of cumylphenol calculated from these figures were 67.3 percent based on phenol and 33.5 percent based on dimer.

It is a relatively simple matter to recover the cumylphenol and the other components from the reaction products after the dimer has been converted in accordance with the process outlined above. It is suitable to first neutralize the reaction products and then subject them to a distillation in which case the first overhead product which is recovered up to 101° C. at 33 mm. of pressure is phenol. The second overhead recovered up to 130° C. at 14 mm. pressure is acetophenone and the third fraction recovered up to 190–197° C. at 4 mm. pressure is the cumylphenol.

While the above description submitted herewith discloses a preferred and practical embodiment of the production of cumylphenol from α-methylstyrene dimer in accordance with the invention, it will be understood that the specific details described are by way of illustration and are not to be construed as limiting the scope of the invention.

We claim:

1. The method of preparing para-α-α-dimethyl benzyl phenol which comprises condensing phenol with 2,5-diphenyl hexene-2 in the presence of concentrated sulfuric acid as catalyst.

2. The method of preparing para-α-α-dimethyl benzyl phenol which comprises treating phenol still bottoms containing 2,5-diphenyl hexene-2 as one of its components with an excess of phenol in the presence of concentrated sulfuric acid as catalyst.

3. The method of preparing para-α-α-dimethyl benzyl phenol which comprises treating phenol still bottoms containing 2,5-diphenyl hexene-2 as one of its components with an excess of phenol in the presence of concentrated sulfuric acid as catalyst, at a temperature lying within the range of about 110°–140° C.

4. The method of preparing para-α-α-dimethyl benzyl phenol which comprises treating phenol still bottoms containing 2,5-diphenyl hexene-2 as one of its ingredients with phenol in the presence of concentrated sulfuric acid as a catalyst at a temperature lying within the range of 110°–140° C.

References Cited in the file of this patent
UNITED STATES PATENTS

| | | |
|---|---|---|
| 2,091,565 | Perkins et al. | Aug. 31, 1937 |
| 2,388,583 | Ward | Nov. 6, 1945 |
| 2,720,549 | Armstrong et al. | Oct. 11, 1955 |
| 2,757,209 | Joris | July 31, 1956 |

OTHER REFERENCES

Bergman et al.: Chem. Abstracts, vol. 25 (1931), pp. 4239–40.

Ellis: "Chemistry of Petroleum Derivatives," page 612, pub. by Chemical Catalog Co. (1934), New York, N.Y.